(12) United States Patent
Kang

(10) Patent No.: US 9,727,620 B2
(45) Date of Patent: Aug. 8, 2017

(54) SYSTEM AND METHOD FOR ITEM AND ITEM SET MATCHING

(71) Applicant: Peekabuy, Inc., San Mateo, CA (US)

(72) Inventor: Hongwen Kang, San Mateo, CA (US)

(73) Assignee: Peekabuy, Inc., Mountain View, CA (US)

( * ) Notice: Subject to any disclaimer, the term of this patent is extended or adjusted under 35 U.S.C. 154(b) by 338 days.

(21) Appl. No.: 14/522,292

(22) Filed: Oct. 23, 2014

(65) Prior Publication Data
US 2015/0120759 A1 Apr. 30, 2015

Related U.S. Application Data

(60) Provisional application No. 61/897,056, filed on Oct. 29, 2013.

(51) Int. Cl.
*G06F 17/30* (2006.01)
(52) U.S. Cl.
CPC .... *G06F 17/3053* (2013.01); *G06F 17/30047* (2013.01)

(58) Field of Classification Search
None
See application file for complete search history.

(56) References Cited

U.S. PATENT DOCUMENTS

| 2002/0087535 | A1* | 7/2002 | Kotcheff | G06F 17/30265 |
| 2008/0285860 | A1* | 11/2008 | Datta | G06K 9/00624 382/224 |
| 2012/0265774 | A1 | 10/2012 | Saul et al. | |
| 2013/0084002 | A1 | 4/2013 | Bhardwaj et al. | |

OTHER PUBLICATIONS

WO, International Search Report, Application No. PCT/US2014/062406, Feb. 19, 2015.

* cited by examiner

*Primary Examiner* — Hung Q Pham
(74) *Attorney, Agent, or Firm* — Orrick, Herrington & Sutcliffe, LLP

(57) ABSTRACT

A matching system and related methods for matching an input item or input item set with stored items and/or stored item sets, and methods for manufacturing and using same.

6 Claims, 13 Drawing Sheets

SYSTEM AND METHOD FOR ITEM AND ITEM SET MATCHING

CROSS-REFERENCE TO RELATED APPLICATIONS

This application is a non-provisional of and claims the benefit of U.S. Provisional Application No. 61/897,056, filed Oct. 29, 2013, which application is hereby incorporated herein by reference.

BRIEF DESCRIPTION OF THE DRAWINGS

FIG. 1b is an exemplary block diagram illustrating an embodiment of the matching server of FIG. 1a.

Figure 1A:
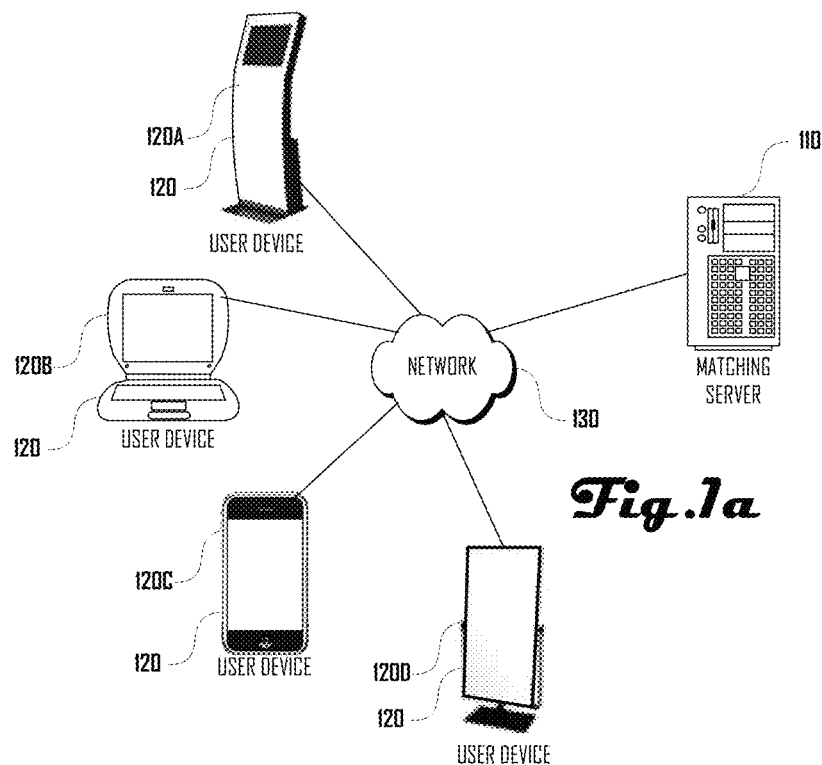
FIG. 1a is an exemplary network diagram illustrating an embodiment of a matching system.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Since currently-available matching systems are deficient, improved matching systems and methods can prove desirable and provide a basis for a wide range of applications, such as in-store item matching, item matching in e-commerce applications and matching with items that a user already owns. This result can be achieved, according to one embodiment disclosed herein, by a matching system 100 as illustrated in FIG. 1a.

Turning to FIG. 1a, the matching system 100 is shown as comprising a matching server 110 operably coupled with a plurality of user devices 120 via a network 130. Example user devices 120 include a user kiosk 120A, a laptop computer 120B, a smartphone 120C, and an intelligent mirror 120D. However, various embodiments can include any suitable user device including a desktop computer, headset computer, smartwatch, gaming console, home entertainment system, or the like. Additionally, further embodiments can also include any desirable plurality of any suitable user devices, and the present example matching system 100 should not be construed to be limiting on the scope and spirit of the present disclosure.

The network 130 may comprise one or more suitable wired or wireless network, including the Internet, a WiFi network, a Bluetooth network, a Wide Area Network (WAN), a Local Area Network (LAN), a cellular network, or the like.

Figure 1B:
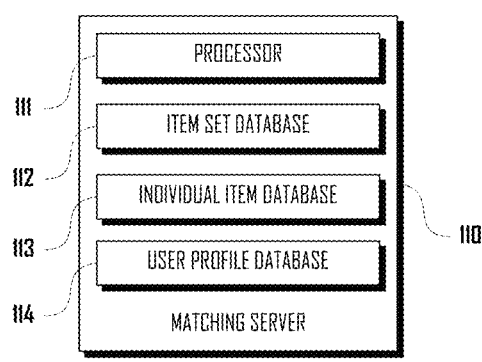

The matching server 110 may comprise one or more suitable server or device that is operable to perform the functions described herein. In some embodiments, the matching server 110 may comprise a cloud-based server system, or the like. As illustrated in FIG. 1b, the matching server 110 may comprise a processor 111, an item set database 112 an individual item database 113 and a user profile database 114. As discussed in further detail herein, the item set database 112 may comprise a set of individual items that are grouped together in a set. Sets can comprise any desirable plurality of individual items and sets may share common items in various embodiments. Additionally, in further embodiments, one set may be a portion of another larger set.

For purposes of illustration, the following disclosure describes item matching systems and methods that relate to items of clothing and sets of clothing items described as outfits, or the like. However, it should be clear that such matching systems and methods may be applied to any suitable type of item, including but not limited to furniture, housewares, electronics, plants, food, tools, people, vehicles, or the like.

Figure 2:
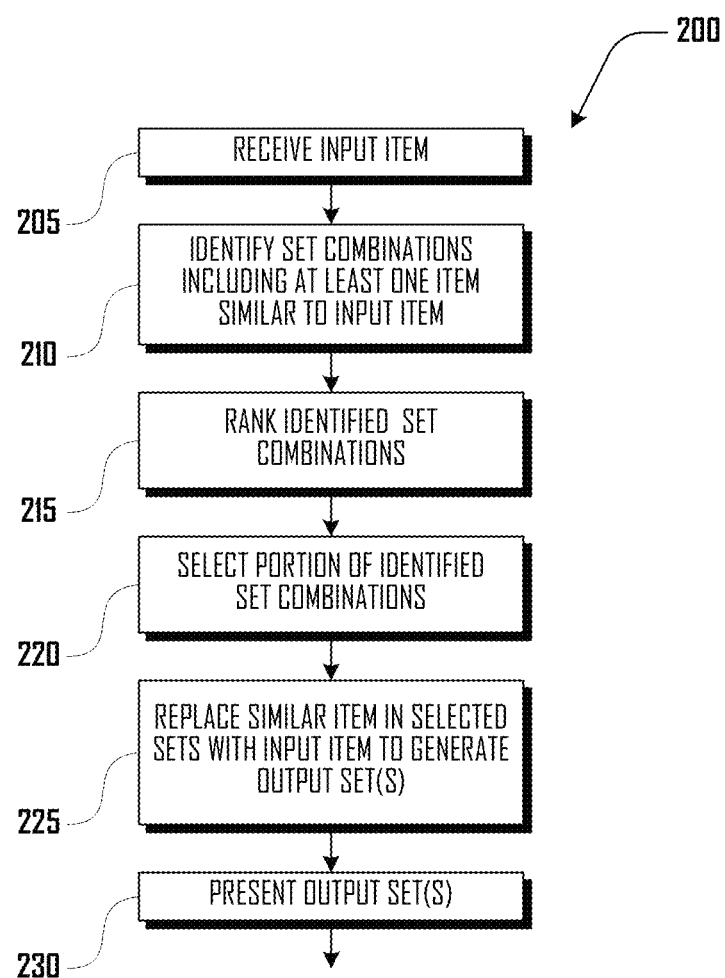
FIG. 2 is an exemplary flow chart illustrating an embodiment of an item matching method.

FIG. 2 is an exemplary flow chart illustrating an embodiment of an item matching method 200. The method 200 begins, in block 205, where an input item is received, and in block 210, set combinations including at least one item similar to the input item are identified. At block 215, the identified set combinations are ranked, and at 220, a portion of the identified set combinations are selected. At 225, the similar item in the selected sets is replaced with the input item to generate one or more output set, and at 230, the one or more output set is presented. For example, referring to FIG. 3, an input item may be a tee-shirt 301 and a search may be conducted for outfit sets 310 that include items similar to the input tee-shirt 301. In various embodiments, such a search may comprise a search of the item set database 112 (FIG. 1b).

As shown in FIG. 2, a plurality of matching sets 310 can be returned that include shirts that are similar to the input tee-shirt 301. For example, a first matching set 310A is illustrated that comprises a fedora 311, a tee-shirt 312 that is similar to the input tee-shirt 301, a pair of shorts 313 and a pair of flip-flops 314.

To generate one or more output sets 320, the input tee-shirt 301 can replace the similar item from each matching sets 310. For example, a first output set 320A corresponds to the first matching set 310A, except that the input tee-shirt 301 has replaced the tee-shirt 312 that was originally present in the first matching set 310A.

In various embodiments, a plurality of matching sets 320 can be identified and ranked according to various suitable criteria that may or may not be defined by a user. For example, in some embodiments, a user may define matching and/or sorting criteria that includes item cost, item style, item season, item color, item size, or the like. Accordingly, item sets may be selected or ranked based on such user-defined criteria. In various embodiments, item sets may be selected based on hard-code rules, statistical models, or the like.

Figure 3:
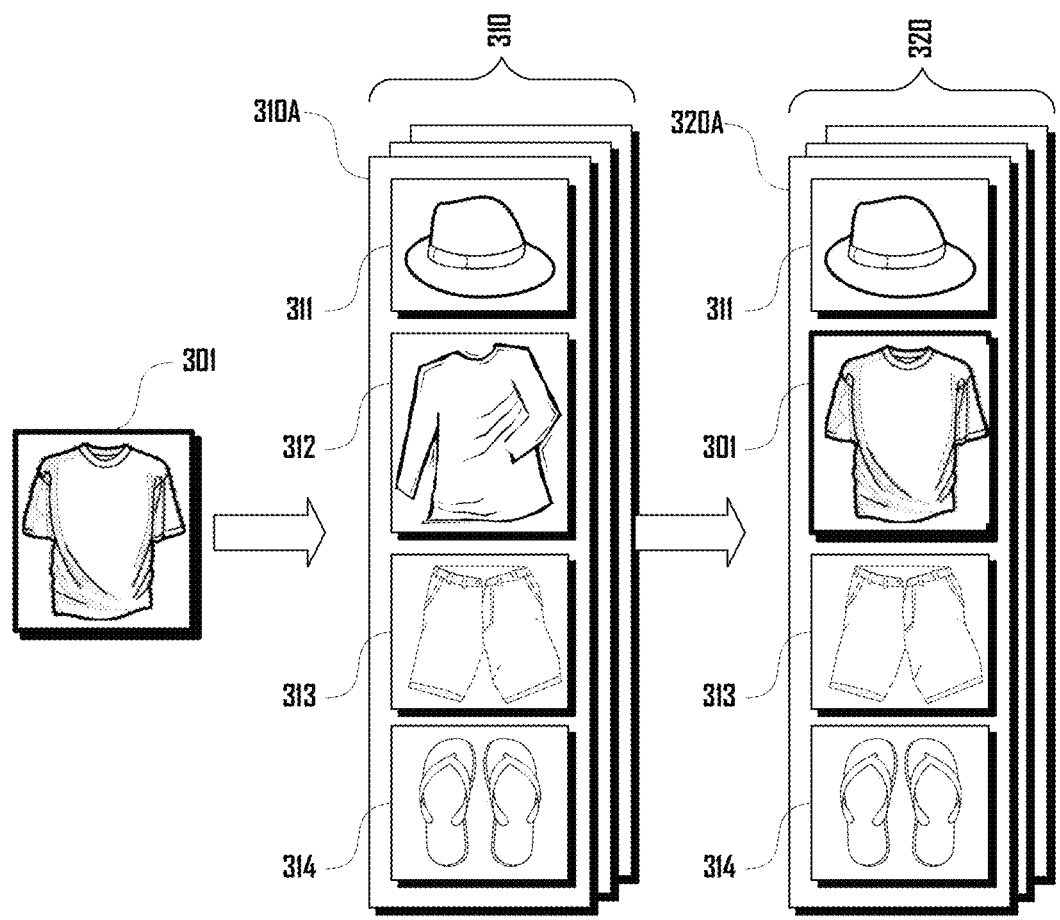
FIG. 3 is an exemplary drawing illustrating an embodiment of the item matching method of FIG. 2.

The embodiments of FIGS. 2 and 3 may be desirable in various embodiments for a user that is shopping for clothes, planning a daily look, organizing wardrobe sets and entertaining. For example, referring to FIG. 3, the input shirt 301 may be a shirt that the user already owns and one or more output set may be outfit recommendations for the user to wear with that shirt. Accordingly, in various embodiments, the individual item database 113 and/or item set database 112 may comprise articles of clothing that are present in a user's personal wardrobe. In various embodiments, the user can filter results by outfit type (e.g., casual, sport, business, formal, summer, winter, fall, spring, or the like).

Alternatively, in some embodiments, the input shirt 301 may be a shirt that is not currently owned by the user, but may be purchased by the user. In such an embodiment, the user can compare this new shirt to clothing articles that are already in the user's wardrobe to determine what outfit combination might be generated with this new shirt and clothing items that the user already owns. This may be desirable because it can inform the user whether such a new purchase would fit into the user's existing wardrobe and whether it would create desirable new outfit combinations.

In another embodiment, the individual item database 113 and/or item set database 112 (FIG. 1b) may comprise articles of clothing that can be purchased by the user. In such an embodiment, and referring to FIG. 3, the input shirt 301 may be a shirt that the user already owns and by identifying output sets 320 the user can identify other articles of clothing that create desirable outfits that include the input shirt 301 that the user already owns. Alternatively, the input shirt 301 can be a shirt that the user does not already own, but that the user is interested in. Accordingly, output sets 320 can include other clothing articles that the user can purchase that will match this new shirt, and can inform the user as to whether the purchase of the new shirt would be desirable and may lead to purchase of one or more items from an output set 320. In various embodiments, the user can filter results by outfit type (e.g., casual, sport, business, formal, summer, winter, fall, spring, or the like). In further embodiments, the user can filter results based on individual item price, output set price, item brand, item size, store availability, or the like.

In various embodiments, it may be desirable to use an existing outfit combination database 112 (FIG. 1b) to generate new outfit combinations that can be added to the outfit combination database 112 (FIG. 1b). For example, in one embodiment, an input item can be selected based on certain defined criteria, and such an input item may be obtained from the individual item database 113 (FIG. 1b), from images selected from the Internet, or other desirable source. As in FIGS. 2 and 3 and as discussed above, a search can be performed for items that are most similar from the outfit combination database 112. A plurality of matching sets 310 can be identified, and if the input item 301 is found to meet a threshold for being similar enough to an item in a given matching set 310, then the input item 310 can replace the similar item in the matching set 310 to generate an output set 320 that is incorporated into the outfit combination database 112. In various embodiments, further criteria may be applied to select matching sets 310 for inclusion in the outfit combination database 112. For example, such criteria can include a threshold on the averaged similarity between the items in the generated outfit and the input outfit or item.

Figure 4:
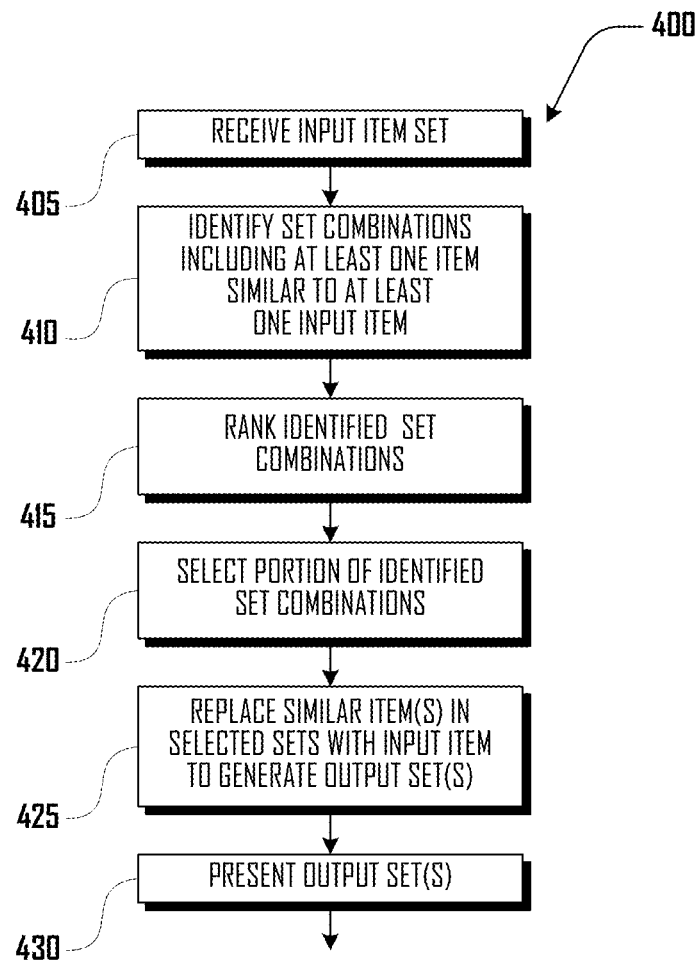
FIG. 4 is an exemplary flow chart illustrating an embodiment of another item matching method.

FIG. 4 is an exemplary flow chart illustrating an embodiment of another item matching method 400. The method 400 begins, at block 405, wherein a set of input items is received, and at block 410, one or more set combinations are identified that include at least one item that is similar to at least one input item, and at 415, the one or more identified set combinations are ranked. At 420, a portion of the identified set combinations are selected, and at 425, one or more similar items in the selected sets is replaced with a respective input item to generate one or more output sets of items. The one or more output sets are presented at 430.

Figure 5:
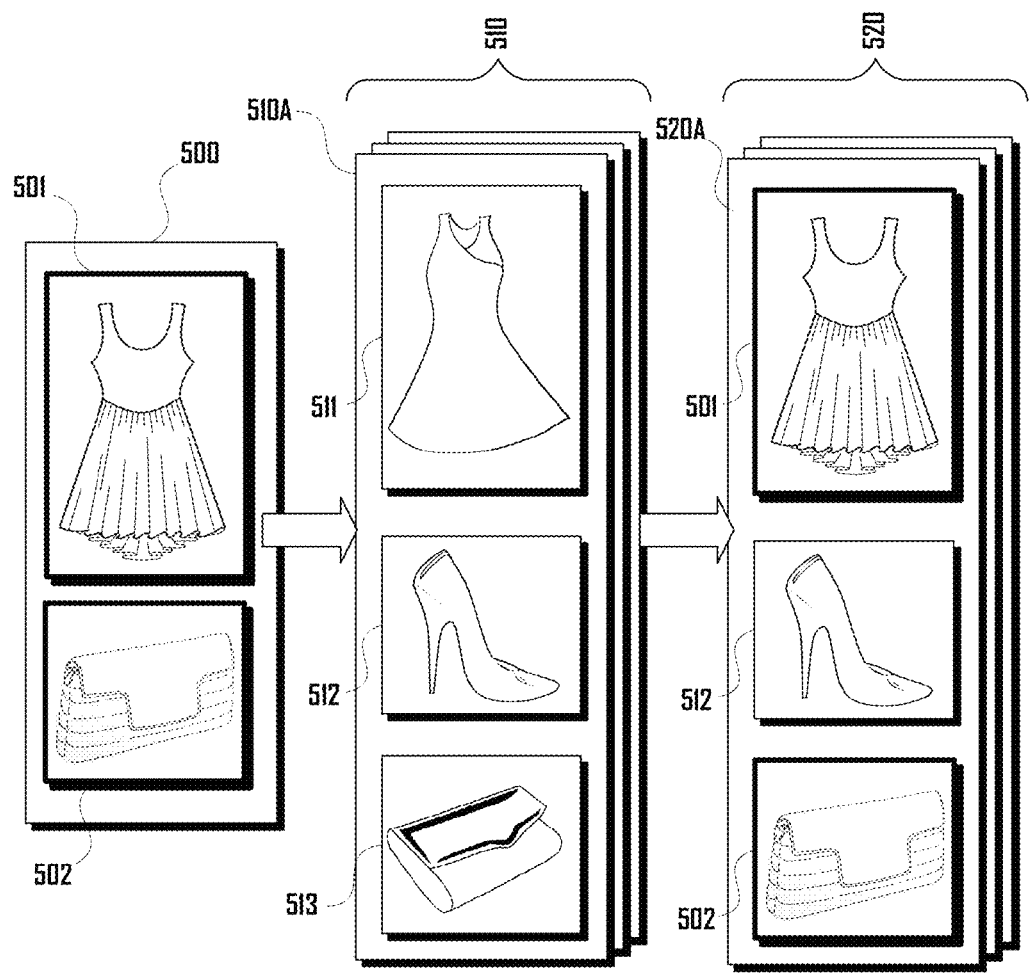
FIG. 5 is an exemplary drawing illustrating an embodiment of the item matching method of FIG. 4.

For example, as depicted in FIG. 5, an input set 500 can comprise a dress 501 and a purse 502. A plurality of matching sets 510 may be identified that include items that are similar to the input items 501, 502, plus additional items. As depicted in FIG. 5, a first matching set 510A may comprise a dress 511 that is similar to the input dress 501, a pair of shoes 512, and a purse 513 that is similar to the input purse 502. In some embodiments, all items in an input set 500 may not have a corresponding match in one or more matching set 510. For example, in further matching sets 510, there may only be a match for the input dress 501, but not for the input purse 502.

The matching sets 510 can be identified and selected in various ways. In one embodiment, each input item 501, 502 can be a basis for a search of the item set database 113 (FIG. 1b) and resulting identified sets can be combined into a set of results. In another embodiment, a search query of the item set database 113 (FIG. 1b) may comprise a plurality of input items 501, 502.

Matching sets may be ranked in any suitable way. In one embodiment, each unique set can be given a certain weight based on various criteria as discussed herein, including highest average similarity of the matching set items over the input set of items. In further embodiments, certain input items may receive higher matching weight compared to other input items. For example, referring to FIG. 5, the input dress 501 may receive a higher matching weight than the input purse 502, because it may be more desirable to have a closer matching dress than a closer matching purse. In other words, a determination may be made that a user would prefer matching sets where that have closer matching dresses because the dress is the base of an outfit, whereas a purse is merely an accessory. Accordingly, there can be a weight bias for sets that include more closely matching dresses compared to closely matching purses. One embodiment orders the outfit combinations set based on the averaged similarity between the input items and the most similar items in the outfit combination set. Corresponding similar items in the outfit can then be replaced with the input items to generate new recommendation combination sets.

To generate output sets 520, the matching items may be replaced with the input items. For example, as shown in FIG. 5, the dress 511 of matching set 510 is replaced by input dress 501 in output set 520A and the purse 513 of matching set 510 is replaced by input purse 502 in output set 520A. The shoes 512 remain the same in both sets 510A, 520A because there is not an input item corresponding to the shoes 512.

In some embodiments, an input item may not replace an item in a set to generate an output set. Instead, one or more input item may simply be added to an output set. For example, referring to the input set of FIG. 5, presume that none of the matching sets 510 include a purse, but do include a dress. In such an example, the input dress 501 may replace a dress in the matching set, but the input purse 502 may simply be added to the output set.

In various embodiments, one or more items of an input set 500 can be items that are part of a user's current wardrobe and one or more items from matching sets 510 and/or output sets 520 can also be part of a user's current wardrobe. In further embodiments, one or more items of an input set 500 can be items that can be purchased by a user or are virtual items and one or more items from matching sets 510 and/or output sets 520 can also be purchased by a user or are virtual items.

For example, in some embodiments, a user can input a plurality of items that are present in the user's wardrobe and receive outfit recommendations that include the input items and further items that are present in the user's existing wardrobe. In another example, the user can input a plurality of items that are present in the user's wardrobe and receive outfit recommendations that include the input items and items that can be purchased by the user. In a further example, a user can input items that the user desires to purchase and receive outfit recommendations that include items from the user's existing wardrobe and/or items that can be purchased by the user that are not present in the user's existing wardrobe.

Figure 6:
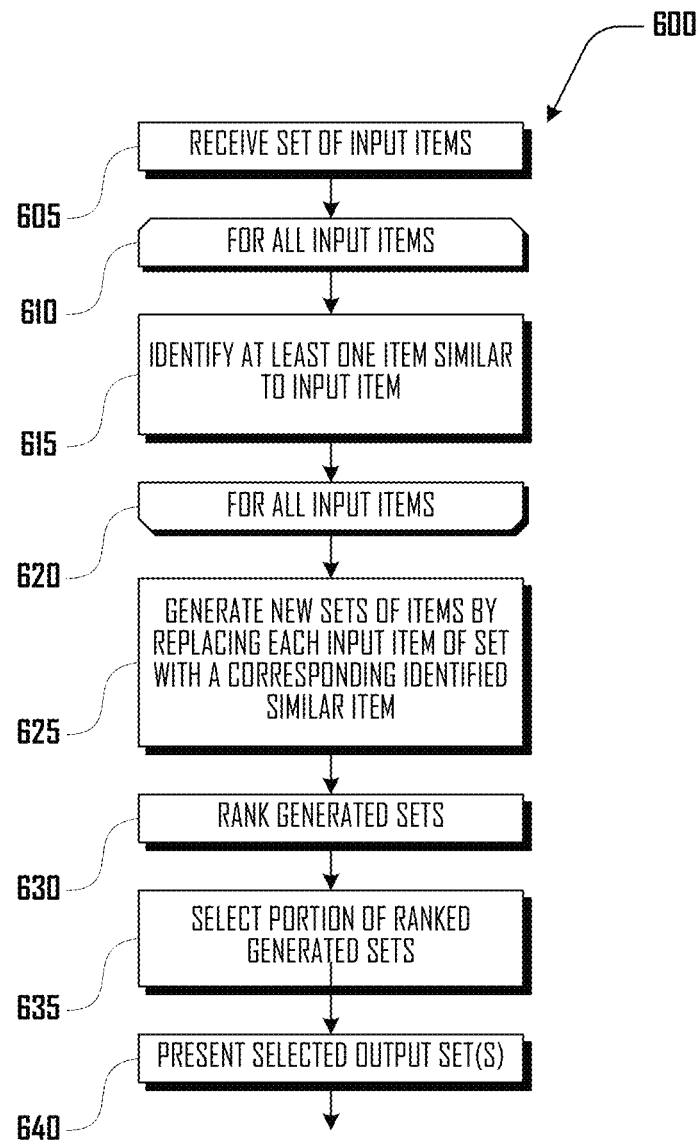
FIG. 6 is an exemplary flow chart illustrating an embodiment of a further item matching method.

FIG. 6 is an exemplary flow chart illustrating an embodiment of a further item matching method 600. The method 600 begins, in block 605, where a set of input items is received and looping block 610 begins a loop for all input items. At block 615, at least one item that is similar to the input item is identified, and looping block 620 ends the loop for all input items. At block 625, new sets of items are generated by replacing each input item of the input set with an identified similar item. In block 630, the generated sets are ranked, and at 635, a portion of ranked generated sets are selected. In block 640, the one or more selected output set is presented.

Figure 7:
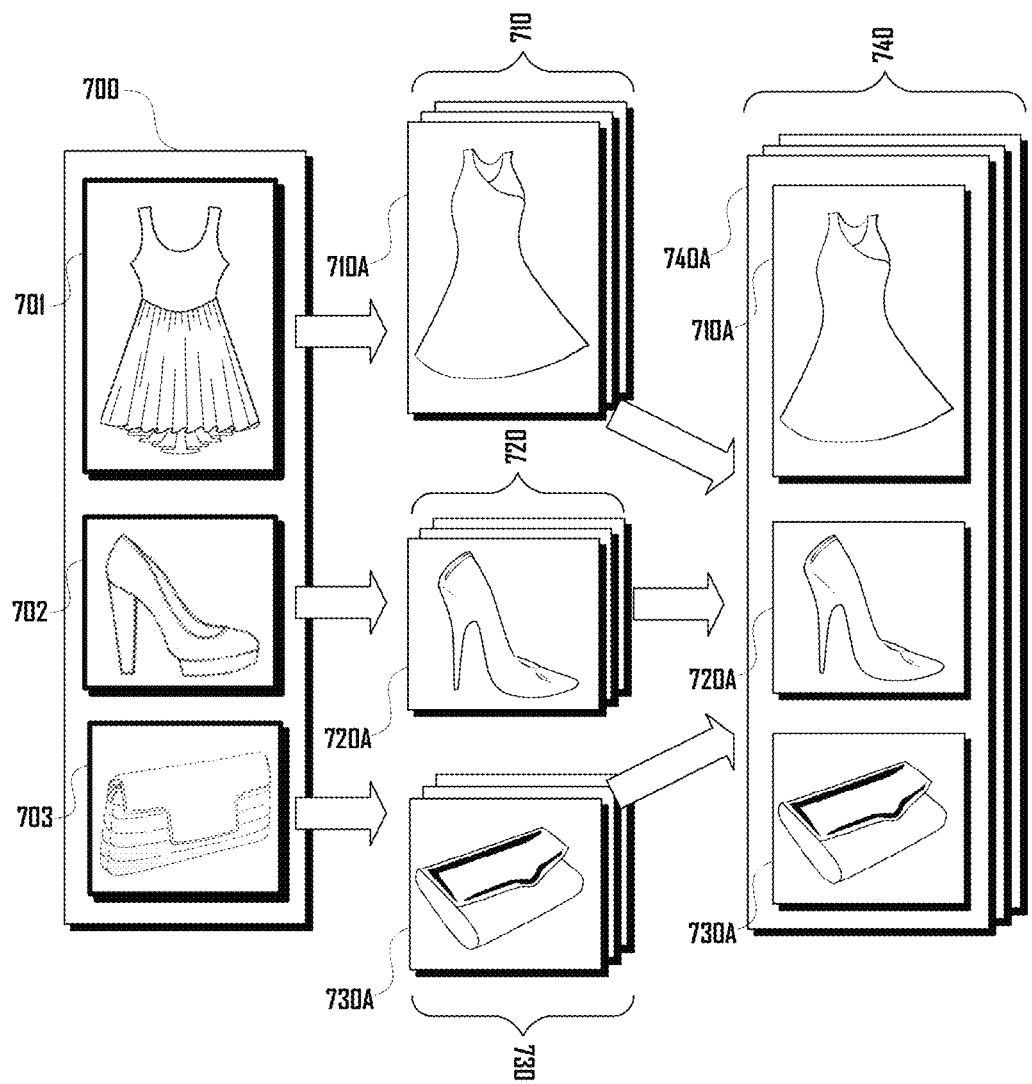
FIG. 7 is an exemplary drawing illustrating an embodiment of the item matching method of FIG. 6.

For example, referring to FIG. 7, an input set 700 can comprise a dress 701, a pair of shoes 702 and a purse 703. Each input item 701, 702, 703 can be used as a search query in the individual item database 113 (FIG. 1b) to identify one or more item in the database 113 that is similar to the input item 701, 702, 703. For the input dress 701 a plurality of similar items 710 can be identified with one being a first matching dress 710A. For the input shoes 702 a plurality of similar items 720 can be identified with one being a first matching pair of shoes 720A. For the input purse 703, a plurality of similar items 730 can be identified with one being a first matching purse 730A. Identified matching items 710, 720, 730 can be combined into a plurality of output sets 740 with one being a first output set 740A that comprises the first matching dress 710A, the first matching shoes 720A, and the first matching purse 730A.

Output sets 740 can be generated in various suitable ways. For example in various embodiments, it may be desirable for output sets to not include duplicate items (e.g., multiple dresses). Accordingly, output sets may be generated that correspond to the types of items and the number of items in the input set. However, in some embodiments, an output set may include fewer or more items than an input set.

In further embodiments, a greedy method can be implemented, where an input object is randomly selected to be replaced with the most similar object. The object is removed from the candidate list and the replaced input object is replaced. Remaining items are iteratively processed until this constraint is removed. A further embodiment is to iteratively explore all the possible combinations by iterating over the input objects each time and finally pick the combination where the average similarity is the highest, or according to some other desirable quality measure. In some embodiments, when generating a new outfit combination, it may be desirable to consider the order of replacing the items to reduce duplicates and improve the overall coherence. In further embodiments, when outputting the outfit combinations, it may be desirable to order the outfits based on various suitable certain criteria in order to improve user satisfaction.

In another embodiment, given an input set 700, a list of recommendations can be generated that reflect a theme corresponding to the input set 700. For example, a set of recommendations can be generated for each input item. These recommendations can be ordered based on various criteria including taking into consideration the averaged similarity between the input set objects and the objects in the generated set recommendation In various embodiments, one or more items of an input set 700 can be items that are part of a user's current wardrobe and one or more items from matching sets 710, 720, 730 and/or output sets 740 can also be part of a user's current wardrobe. In further embodiments, one or more items of an input set 700 can be items that can be purchased by a user or are virtual items and one or more items from matching sets 710, 720, 730 and/or output sets 740 can also be purchased by a user or are virtual items.

For example, in some embodiments, a user can input a plurality of items that are present in the user's wardrobe and receive outfit recommendations that include further items that are present in the user's existing wardrobe. In another example, the user can input a plurality of items that are present in the user's wardrobe and receive outfit recommendations that include items that can be purchased by the user. In a further example, a user can input items that the user desires to purchase and receive outfit recommendations that include items from the user's existing wardrobe and/or items that can be purchased by the user that are not present in the user's existing wardrobe.

An input item may comprise an input image in various embodiments. Such an input image may be an image generated by a system administrator or may be an image selected or captured by a user. For example, a user can select an image from the internet or may capture an image via a smartphone device or the like. In some embodiments, it may be desirable to preprocess the input image of an item to extract the item from the foreground. Additionally, it may be desirable to associate various category data with an image, which may improve the quality of item matching and recommendation.

Figure 8:
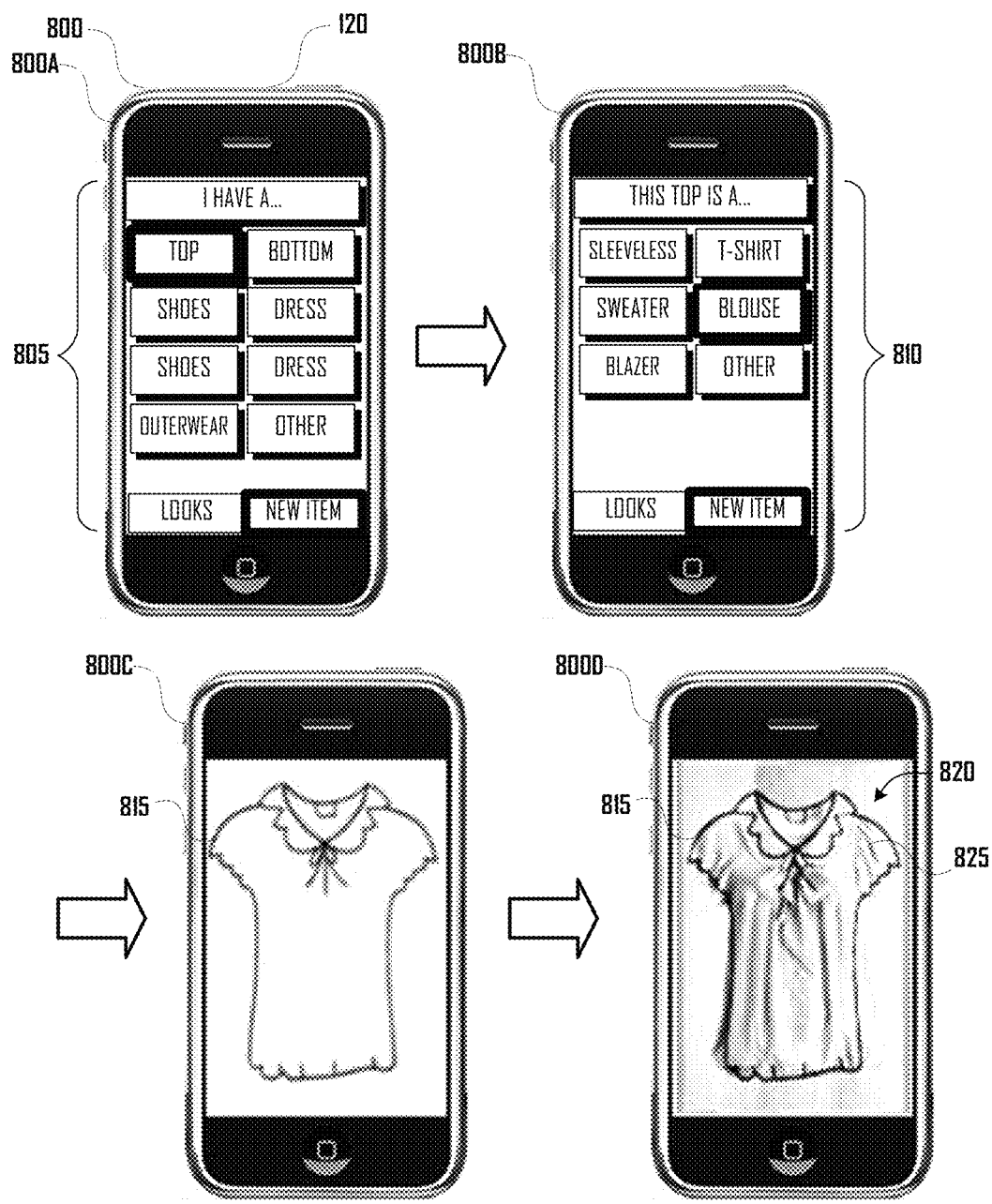
FIG. 8 depicts an interface for generating an input image in accordance with one embodiment.

For example, FIG. 8 depicts an interface 800 for generating an input image in accordance with one embodiment with successive steps in generating the input image illustrated respectively in interfaces 800A, 800B, 800C and 800D. In the first interface 800A, a user may select an option for generating a new item and indicate a first category of the item via a first menu 805. As illustrated in the first interface 800A, the user has selected that the item is a "TOP." In the second interface 800B, the user can select a sub-category, via a second menu 810, which in this case is "BLOUSE."

In various embodiments, a category overlay can be displayed that allows a user to capture or edit an existing image so that it best fits into the category overlay. For example, given that "TOP" and "BLOUSE" were selected in menus 805, 810 a "BLOUSE TOP" category overly 815 can be displayed as illustrated in interface 800C. The category overlay can be used in conjunction with a device camera to guide the user in capturing an image that best fits within the category overly, including orientation of the item, size of the item in the frame, and the like. Accordingly, the user can move the camera close or farther from the item and rotate or otherwise move the camera so that the item is as close to within the category overly 815 as possible. As shown in interface 800D an image 820 that includes blouse 825 is shown where the blouse is substantially within the category overly 815. The interface may automatically capture an image when the item is determined to be within the category overly 815 or image capture may be initiated by a user. Alternatively, a user may load an existing image that was previously captured by the user or an image that was obtained elsewhere (e.g., the on Internet). As alternatively shown in the interface 800D, a user can move, size, and rotate the image 820 so that the displayed blouse 820 is substantially within the category overly 815. For example, pinching and dragging with fingers on a touch screen of user device may facilitate such moving, sizing and rotating.

Figure 9:
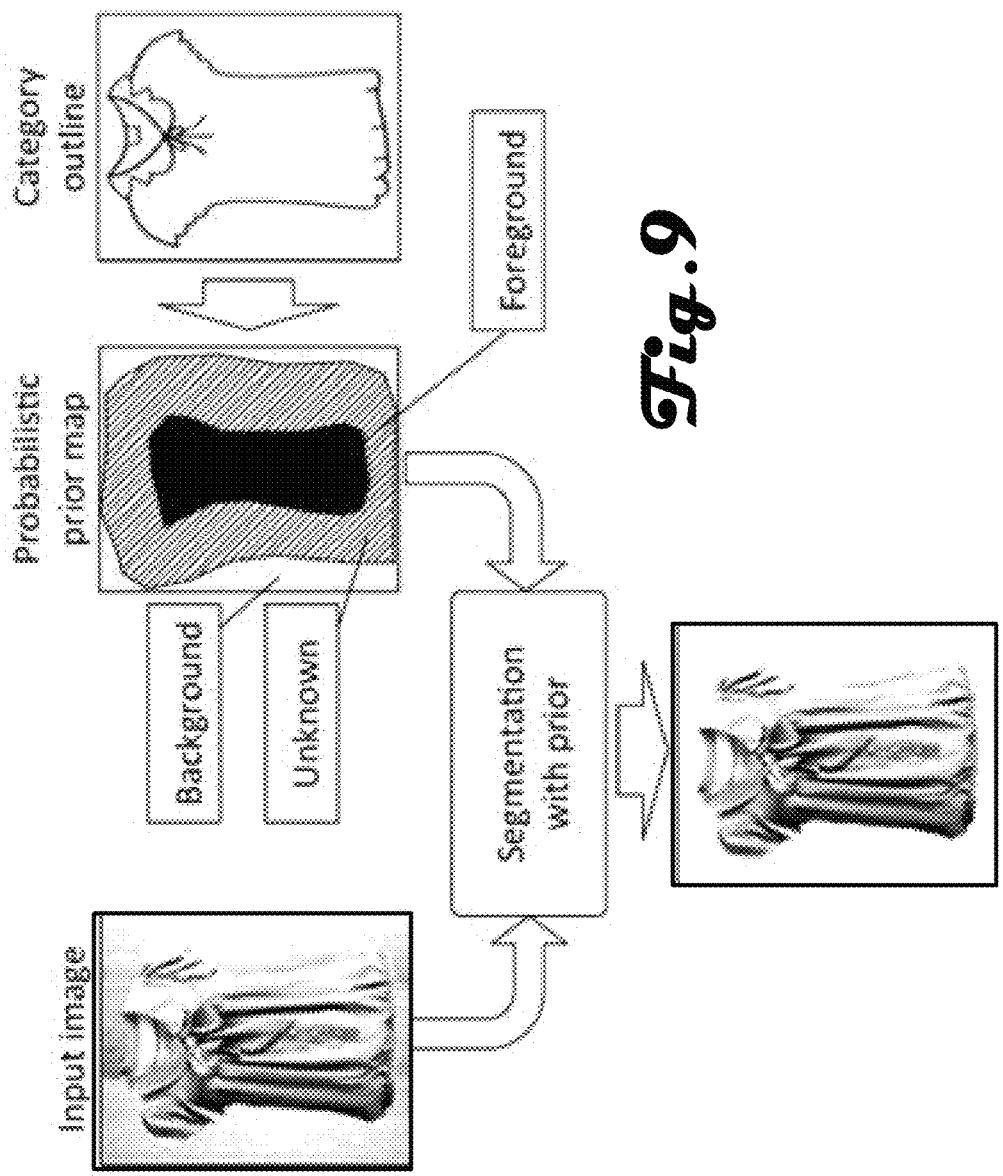
FIG. 9 depicts a method of input image processing in accordance with an embodiment.

In various embodiments, a captured input image can receive further processing. For example, it can be assumed that there is a high probability that the input item and the overlaid category outline are aligned. Accordingly, a probabilistic prior map can be generated that separates the input image regions into areas of high probability of foreground, high probability of background and unknown. These areas labels can be discreet or continuous, (e.g., marked with different probability values). Using the prior map, image processing techniques such as graph cut, or the like can be used to extract the item from the background. An example of this process is illustrated in FIG. 9.

Figure 10:
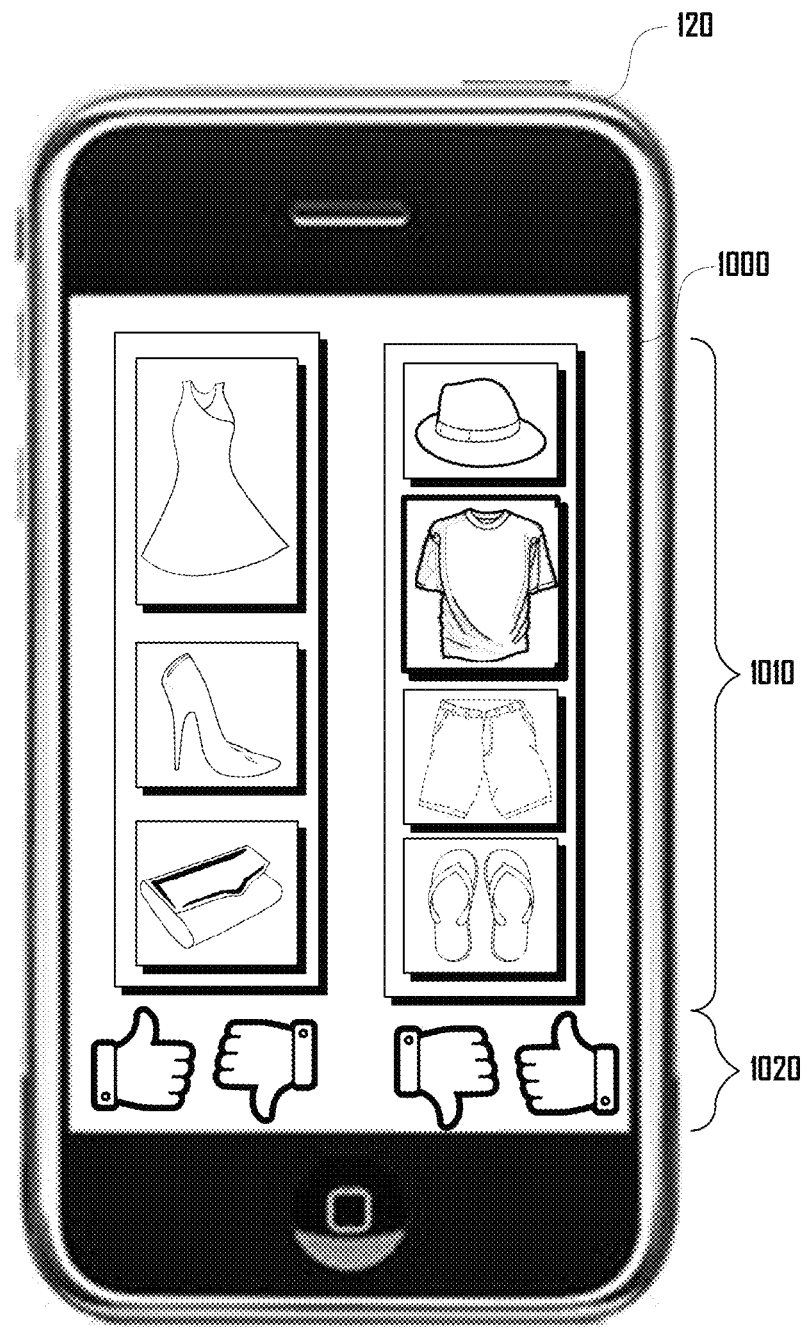
FIG. 10 depicts an interface on a user device for user rating of item sets in accordance with an embodiment.

In various embodiments, it may be desirable to allow users to rate item sets or outfits. For example, as depicted in FIG. 10, a user device 120 may present one or more item set 1010, and the user may indicate whether the user likes or dislikes a given item set via respective input buttons 1020. In the example shown in FIG. 10, thumbs-up and thumbs-down buttons are respectively associated with two presented item sets 1010. In further embodiments, an interface may be configured to have a user provide various indications of affinity for an item or item set presented on a user device 120, including a three, four, our five star rating, or a rating system that including a slider, or the like.

Such rating of items and/or item sets by users may be desirable because such data can be used to rank and filter items and/or item sets globally among many users or for the user that provides the rating. User ranking may be used to determine and predict user preference and to filter and rank identified matching item sets or items, which may be desirable so as to improve user experience. Data related to user preference may be stored in the user profile database 114 (FIG. 1b).

In various embodiments, user input related to preference of items or item sets may be used as input for supervised machine learning to train a user preference prediction algorithm, module, or the like. Supervised machine learning can include any suitable type, including neural networks, single-layered perceptron, multi-layer perceptron, decision trees, Radial Basis Function (RBF) networks, statistical learning algorithms (e.g., a Bayesian network), Support Vector Machine (SVM), Relevance Vector Machine (RVM), linear or logistic regression, and the like. In some embodiments, aspects of the present disclosure may be applied to semi-supervised machine learning techniques.

Figure 11A:
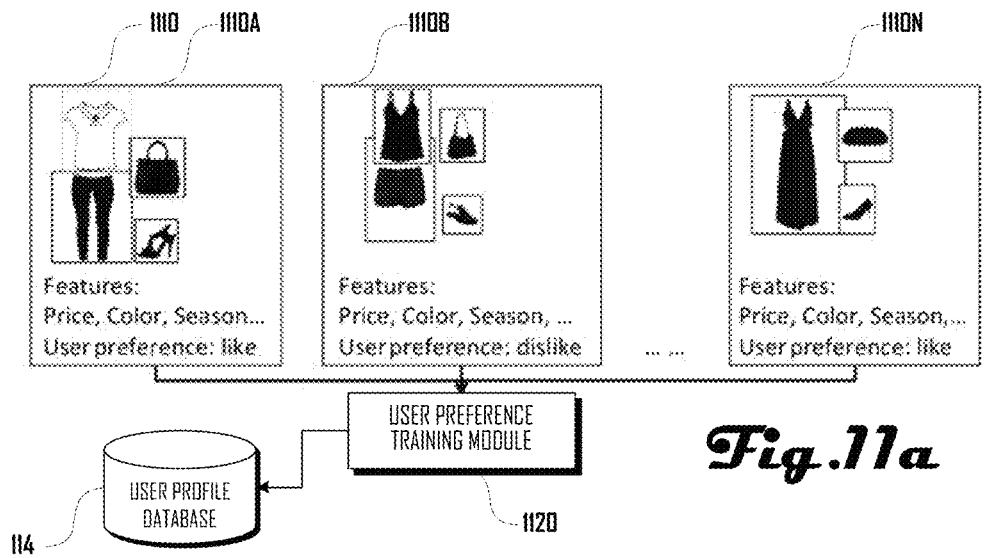
FIG. 11a illustrates a method of training a user preference module in accordance with an embodiment.

For example, as illustrated in FIG. 11a, a plurality of training data 1110 shown as 1110A-N is input into a user preference training module 1120, and a trained algorithm, module or the like can be stored in the user profile database 114 or other suitable location. Training data may include any suitable data related to one or more item, set of items, or the like. For example, training data may include data such as price, color, season, gender, style type, pattern, size, texture, and the like. In various embodiments, such features may be automatically extracted from item images and/or item set images as discussed herein. In some embodiments, a user may be required to train her preferences by providing a defined set of input training data, whereas in some embodiments, a user may provide user-selected training data over a period of time.

Figure 11B:
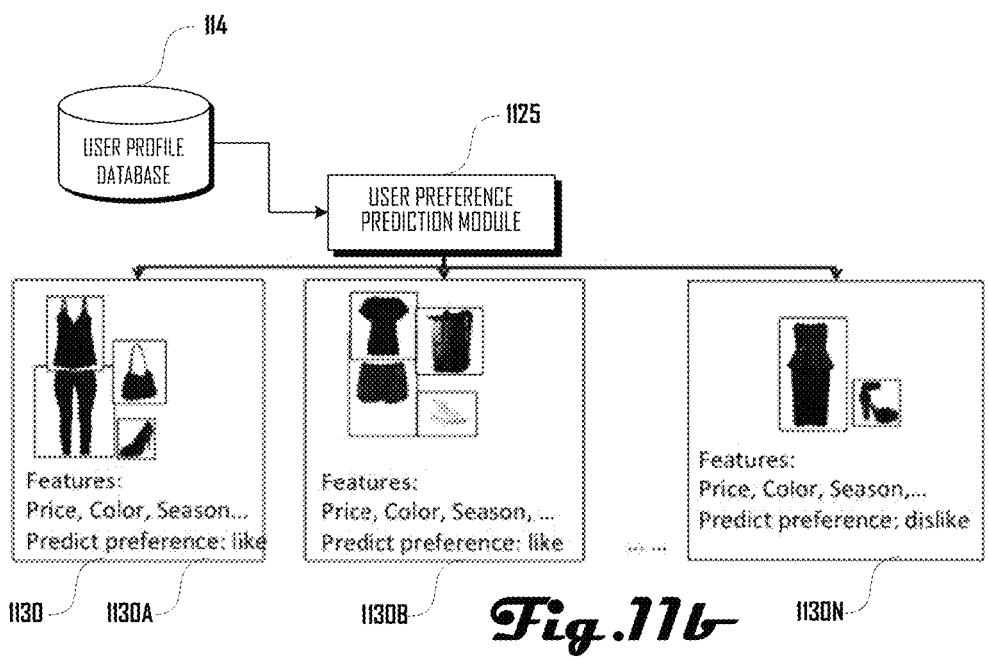
FIG. 11b illustrates a method of generating predictions of items and item sets that are preferred by a user in accordance with an embodiment.

To provide predictions of items or item sets that a user would prefer, the trained algorithm or module can search the item set database 112 and/or individual item database 113 for items or item sets that meet the user's preferences. In some embodiments, user preference predictions can be used to selected items or item sets that a user can purchase and/or items or item sets from items that are already owned by the user. In some embodiments, new item sets can be generated based on user preference. As depicted in FIG. 11b, a user prediction module 1125 can use data from the user profile database 114 to output a plurality of outfit recommendations 1130, namely recommendations 1130A-N.

In various embodiments, the system and methods discussed herein may be applied to discrete physical locations such as stores, malls or shopping districts. For example, a user can visit a clothing store and receive various item or outfit recommendations based on inventory for that store and/or the user's personal wardrobe. In one embodiment, a user can obtain feedback on how to style an item of interest that is present at the store. A user can also receive feedback on how an item of interest may be styled with the user's existing wardrobe.

In further embodiments, a user can receive item or item set recommendations based on an article of clothing that the user is currently wearing. For example, the user may use a kiosk 120A, smart-mirror 120D or other device 120 (See FIG. 1a) at a retail location and the device 120 can capture an image of the user and what the user is wearing. The processed image can be used to make item and/or item set recommendations based on store inventory and/or user wardrobe. In various embodiments, a device 120 may be configured to obtain sales, promotions, coupons, discounts or the like, associated with a given retail location. Accordingly, in various embodiments the system 100 (FIG. 1a) can interface with one or more merchant information database to receive data about store inventory.

Similarly, the present systems and methods may be applied to e-commerce. For example, a user browsing an online store can receive item and/or item set recommendations based on e-store inventory and/or user wardrobe. In various embodiments, a user can use items from an e-store, or the like, as input items or can use item sets from an e-store as an input item set as described herein.

Implementing a search of similar items can be done in various suitable ways, and input items and/or input item sets can be generated in any suitable matter. For example, in some embodiments, a human operator may code item images or item identifiers to be associated with suitable descriptors. In further embodiments, item images can be processed automatically without user or operator intervention.

Figure 12:
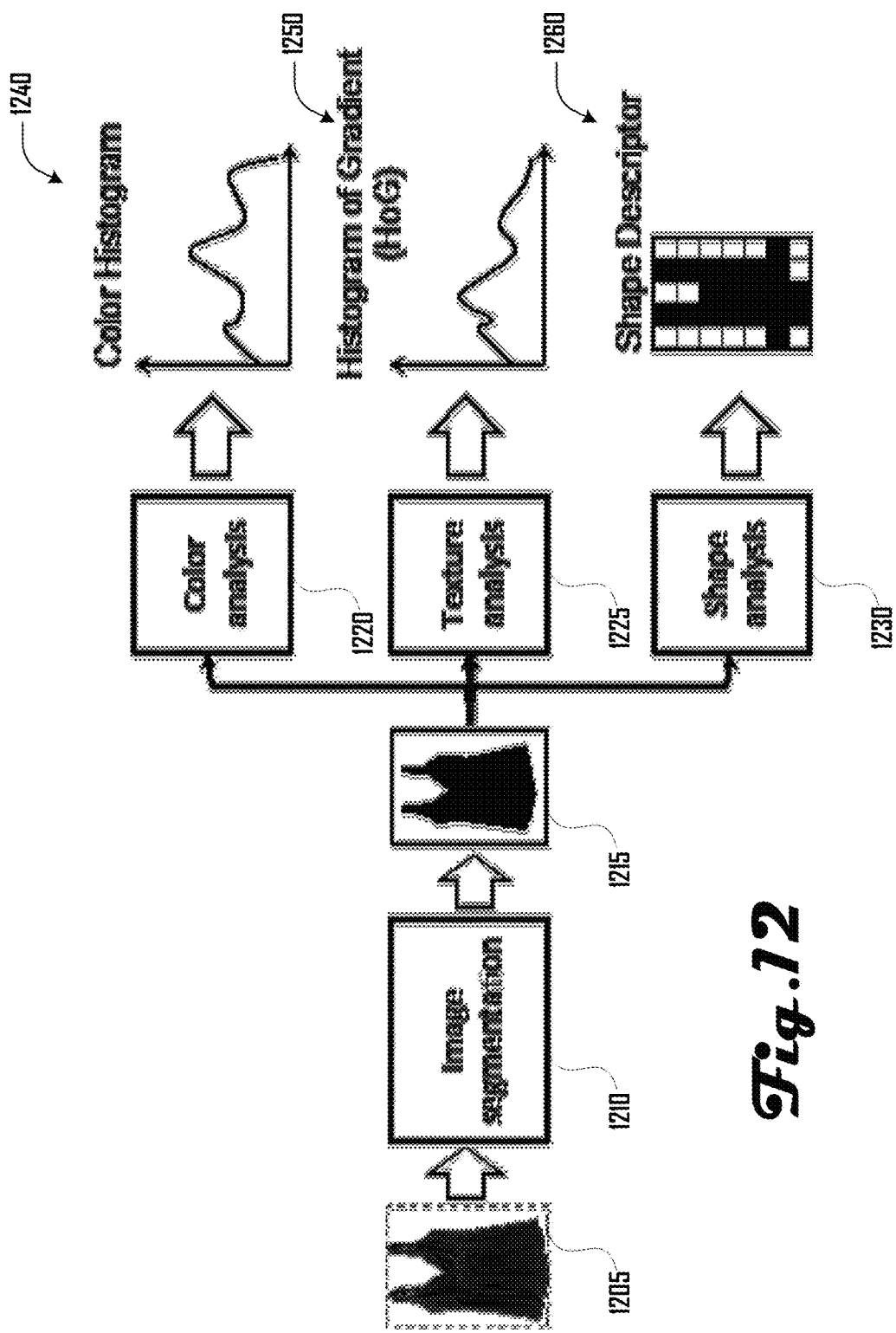
FIG. 12 illustrates a method of generating image descriptors for an input image in accordance with an embodiment.

In one embodiment, visual information of items can be captured and stored as mathematical descriptions. One specific embodiment of such mathematical description is present as a mathematical vector of digits. In one example, as illustrated in FIG. 12, a raw image 1205 is captured or obtained, and image segmentation is applied to the raw image 1205 in block 1210, which yields a segmented image 1215. An example of image segmentation processing discussed above in relation to FIG. 9.

The segmented image 1215 can be analyzed to obtain various types of suitable data that can be used in item and item set matching as discussed herein. In the example of FIG. 12, analysis comprises color analysis in block 1220, texture analysis in block 1225, and shape analysis is block 1230, which respectively yield a color histogram 1240, a histogram gradient (HoG) 1250 and a shape descriptor 1260.

In various embodiments, the color descriptor can comprise of the number of image pixels on various color channels. This color descriptor can be represented as a vector named color histogram 1240. Similarly, a texture descriptor can measure the response of an object item at different spatial locations with respect to texture filters. One specific embodiment of a texture descriptor is Histogram of Gradient (HoG) descriptor. Additionally, based on the object item segment, it is possible to divide the image into a fixed number of regions and annotate whether each region contains the image segment or not. Such annotation can be transformed into a mathematical representation of 0s and 1s, where 0 means that the image region does not contain image segment and 1 represents the image region contains image segment. For example, the shape descriptor 1260 shows images regions that contain an image segment in black and regions that do not contain an image segment in white.

Figure 13:
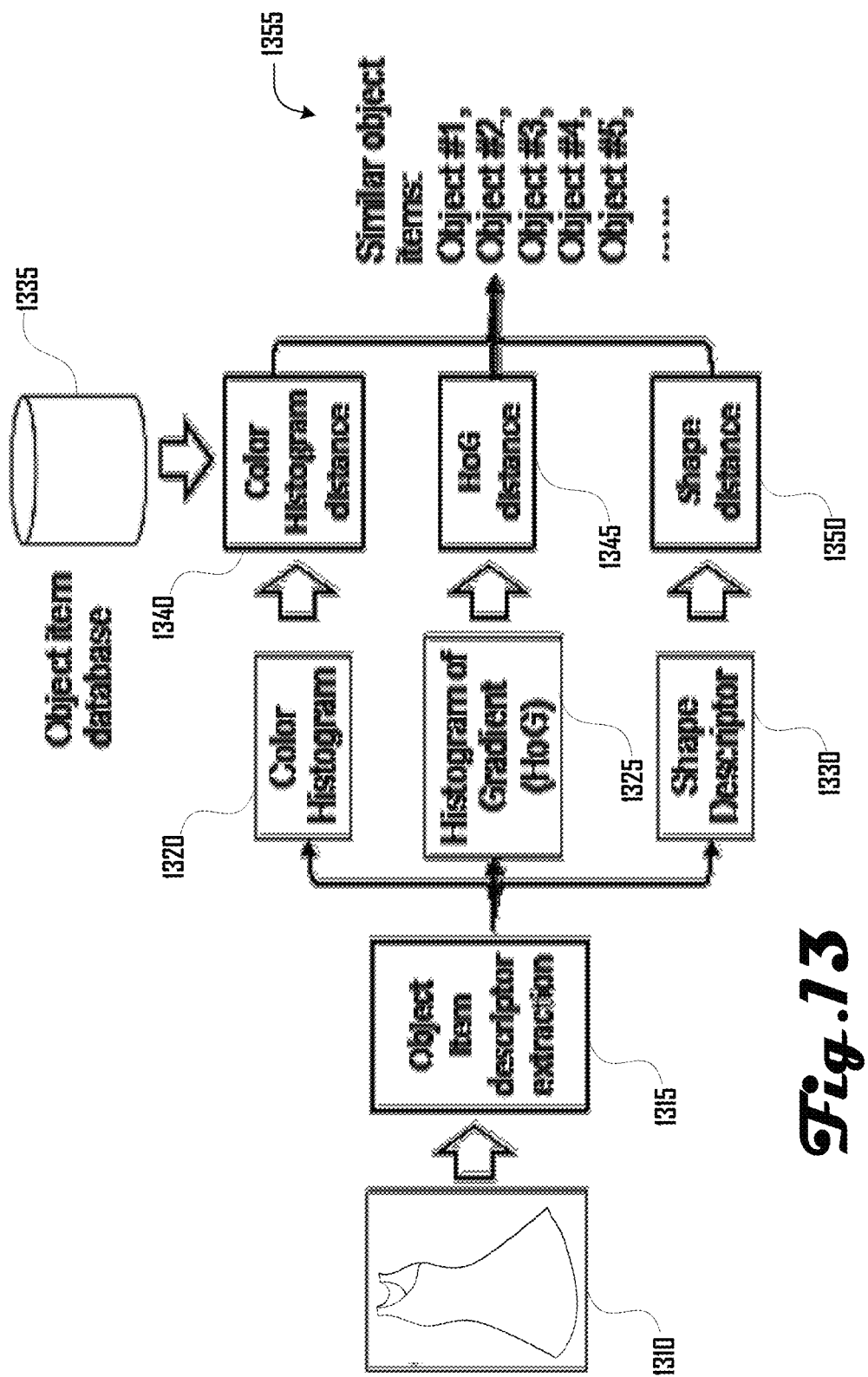
FIG. 13 illustrates a method of identifying similar stored objects compared to an input image via distance of a plurality of image descriptors, in accordance with an embodiment.

In various embodiments, images of items and/or item sets can be processed to obtain image data as discussed above and a determination of matching for items or item sets can be performed based on such data. For example, as illustrated in FIG. 13, a new item image 1310 can be generated or otherwise provided by a user and object item description extraction can be performed on the image 1310, in block 1315. New object descriptors such as color histogram 1320, HoG 1325 and shape descriptor 1330 can be compared to the same descriptors for items and/or item sets from an object item database 1335 and the distance (e.g., Euclidian distance) can be calculated for each, in blocks 1340, 1345 and 1350. The determined distance of the descriptors for the new item image 1310 compared to items and or item sets can be used to identify a plurality of similar object items 1355 and/or a plurality of item sets (not shown in FIG. 13).

Matching an input item or input item set with other items or item sets can comprise comparison of any suitable image descriptor generated by image analysis or image descriptor based on category or the like such as keyword, price, color, season, style or the like. Such comparison variables can be suitably weighted based on user preference or based on importance of the variable.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives. Additionally any of the steps of methods described herein can be performed by a human operator or may be performed automatically without human operator interaction.

What is claimed is:

1. A method of item matching implemented on a processor, the method comprising:
   receiving a first input item image;
   performing image segmentation on the first input item image to generate a segmented input item image;
   performing color analysis, texture analysis, and shape analysis on the segmented input item image to generate a plurality of input item-image descriptors;
   identifying a plurality of stored item sets stored on a database that includes a second item image, wherein the second item image is similar to the first input item image, wherein said identifying the plurality of stored item sets comprises comparing the plurality of generated input item image descriptors to corresponding item image descriptors associated with the second item image;
   ranking the plurality of identified stored item sets;
   selecting a portion of the plurality of ranked stored item sets;
   replacing the second item image in each of the selected portion of the plurality of ranked stored item sets with the first input item image to generate a plurality of output sets; and
   presenting the plurality of generated output sets.

2. The item matching method of claim 1, further comprising:
   associating a plurality of input item-image descriptor categories with the first input item image wherein said identifying the plurality of stored item sets includes comparing the plurality of associated input item image descriptor categories to corresponding item image descriptor categories associated with the plurality of stored item sets.

3. A method of item matching implemented on a processor, the method comprising:
   receiving a first input item set including a plurality of input item images;
   performing image segmentation on the plurality of input item images to generate a plurality of segmented input item images;
   performing color analysis, texture analysis, and shape analysis on the plurality of segmented input item images to generate a plurality of input item image descriptors;
   identifying a plurality of stored item sets stored on a database that includes a second item image that is similar to at least one input item image of the plurality of input item images, wherein said identifying the plurality of stored item sets comprises comparing the plurality of generated input item image descriptors to corresponding item image descriptors associated with the second item image;
   ranking the plurality of identified stored item sets;
   selecting a portion of the plurality of ranked stored item sets;
   replacing the second item image in each of the selected portion of the plurality of ranked stored item sets with a corresponding first input item image of the plurality of input item images to generate a plurality of output sets; and
   presenting the plurality of output sets.

4. The item matching method of claim 3, further comprising:
   associating a plurality of input item-image descriptor categories with the plurality of input item images, wherein said identifying the plurality of stored item sets includes comparing the plurality of associated input item image descriptor categories to corresponding item image descriptor categories associated with the plurality of stored item sets.

5. A method of item matching implemented on a processor, the method comprising:
   receiving a first input item set including a plurality of input item images;
   performing image segmentation on the plurality of input item images to generate a plurality of segmented input item images;
   performing color analysis, texture analysis, and shape analysis on the plurality of segmented input item images to generate a plurality of input item image descriptors;
   identifying, for each input item image, at least one similar stored item image within a plurality of stored item images on a database, wherein said identifying comprises comparing the plurality of generated input item image descriptors to corresponding item image descriptors associated with the plurality of stored item images;
   replacing the plurality of input item images with a respective identified similar stored item image in various combinations to generate a plurality of generated item sets;
   ranking the plurality of generated item sets;
   selecting a portion of the plurality of ranked generated item sets to generate output sets; and
   presenting the output sets.

6. The item matching method of claim 5, further comprising:
   associating a plurality of input item-image descriptor categories with the plurality of input item images, wherein said identifying, for each input item image, at least one similar stored item image includes comparing the plurality of associated input item-image descriptor categories to corresponding stored item-image descriptor categories associated with the plurality of stored item image sets.

* * * * *